United States Patent [19]
Turner et al.

[11] 4,008,614
[45] Feb. 22, 1977

[54] REMOVABLE PROBE UNIT FOR ELECTRONIC MEASURING SYSTEM

[75] Inventors: Robert Bruce Turner, Weymouth; Paul E. Brefka, Southboro, both of Mass.

[73] Assignee: Johnson & Johnson, New Brunswick, N.J.

[22] Filed: Apr. 28, 1976

[21] Appl. No.: 681,211

[52] U.S. Cl. .......................... 73/343 R; 73/362 AR
[51] Int. Cl.² ........................................... G01K 1/14
[58] Field of Search ................... 73/343 R, 362 AR

[56] References Cited
UNITED STATES PATENTS

| 3,348,415 | 10/1967 | Ash, Jr. | 73/362 AR |
|---|---|---|---|
| 3,379,063 | 4/1968 | Schonberger | 73/362 AR |
| 3,681,991 | 8/1972 | Eberly, Jr. | 73/362 AR |
| 3,946,613 | 3/1976 | Silver | 73/362 AR |
| 3,949,609 | 4/1976 | Hammerslag | 73/362 AR |

*Primary Examiner*—Donald O. Woodiel
*Assistant Examiner*—Joseph W. Roskos
*Attorney, Agent, or Firm*—John J. Simkanich

[57] ABSTRACT

An independent, replaceable probe unit for an electronic measuring system having a housing with a compartment for receiving the probe unit, including; a probe member having a probe element bearing a sensor device for sensing the parameter to be measured by the system and a cable electrically connected to the sensor device; and a probe chamber removably mountable in the compartment and having a recess for receiving the probe member, the chamber including contact means interconnected with the cable and disposed to engage corresponding contact means in the compartment for interconnecting the probe member with the electronic measuring system.

10 Claims, 11 Drawing Figures

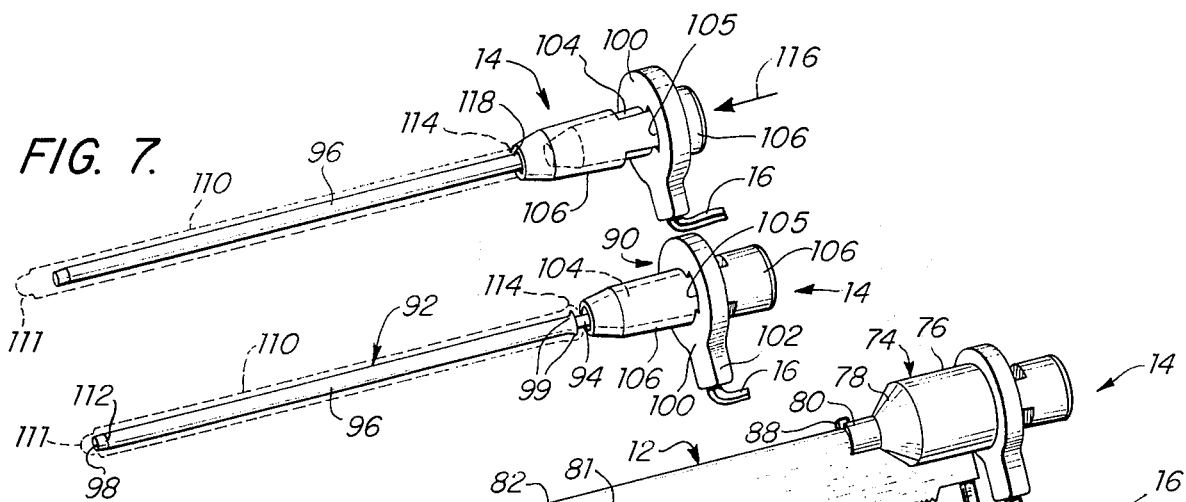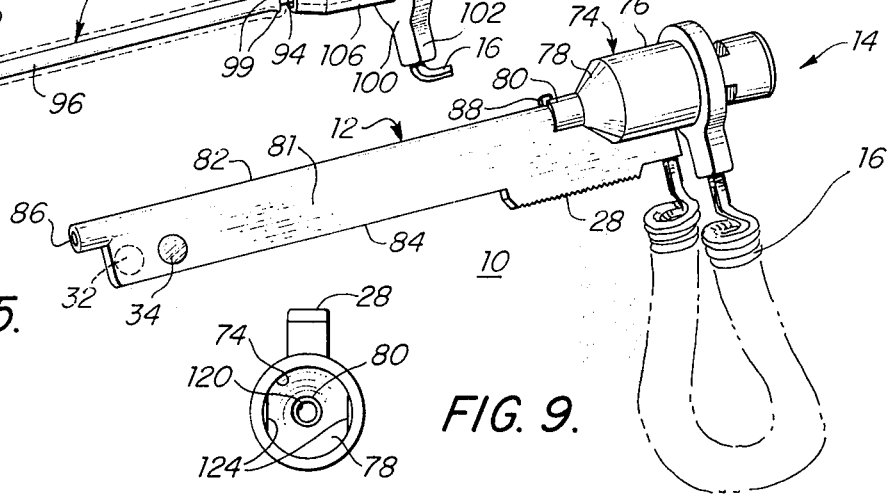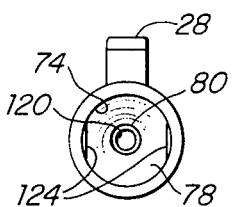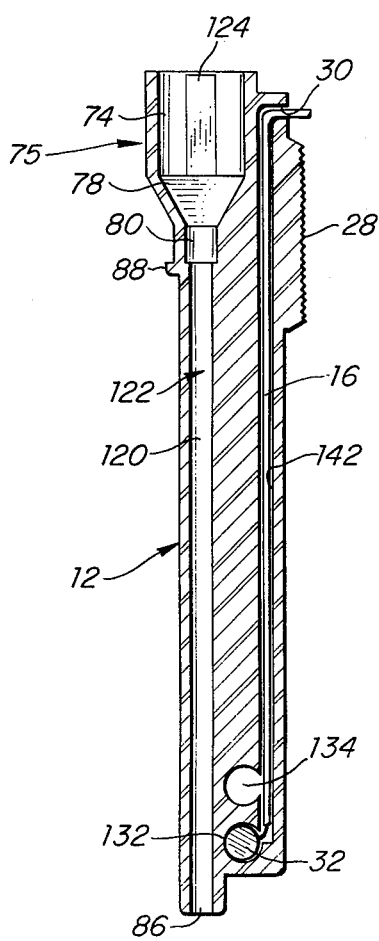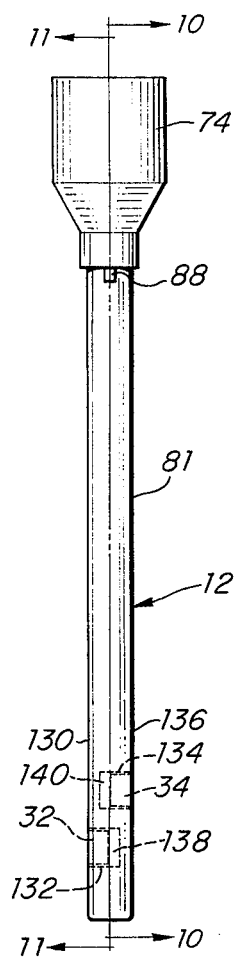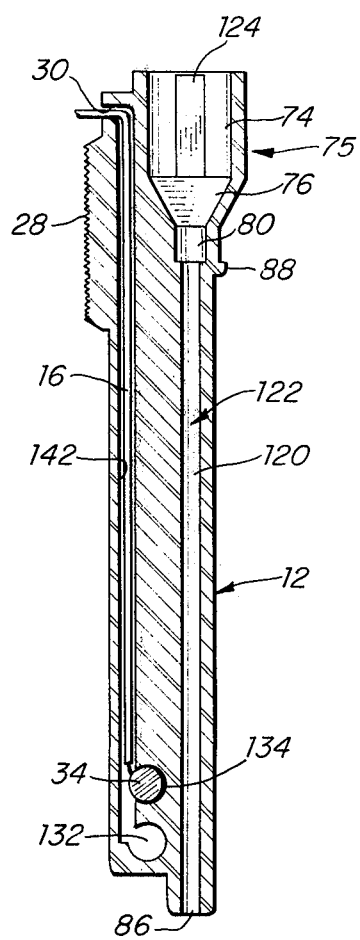

4,008,614

REMOVABLE PROBE UNIT FOR ELECTRONIC MEASURING SYSTEM

FIELD OF INVENTION

This invention relates to an independent, replaceable probe unit for an electronic measuring system, and more particularly to such a probe unit including a probe member and probe chamber for receiving the probe member, which may be removed and replaced together, as a single unit.

BACKGROUND OF INVENTION

Electronic thermometers are being used ever more widely in the health care industry. Typically these thermometers use a heat-sensitive probe connected to the thermometer circuitry by a cable, and the probe is stored in a sheath or well or other holder associated with the thermometer housing. The probes are used in combination with inexpensive, disposable plastic covers. The probe is quickly inserted in a new probe cover just before a patient's temperature is taken and is easily removed for disposal afterwards. See U.S. Pat. No. 3,929,018. The probes are often easily disconnected from the rest of the thermometer and replaced with another probe in the event of malfunction or contamination of the probe. See U.S. Patent application Ser. No. 473,495, filed May 28, 1974. However, when the user is unaware that the probe is contaminated, he may inadvertently replace the contaminated probe in the well or holder and thereby contaminate the whole thermometer; see U.S. Pat. No. 3,681,991; or the user may even replace the probe in the holder with the used cover still in place on the probe. Subsequent replacement of the probe does not help since each new probe will become contaminated upon insertion into the holder. Only sterilization of the holder, which is part of the thermometer housing, can now alleviate the problem.

Generally when the thermometer is used for oral and rectal temperature measuring it is expedient, psychologically perhaps even more so than hygienically, to use two separate probes as well as two different sets of probe covers. The added expense of a second probe is not inconsequential in the cost of such thermometers.

In use, moisture and debris may attach itself to the probe and eventually fall off and accumulate in the bottom of the well or holder. The accumulation can become a growth medium for infectious matter.

SUMMARY OF INVENTION

It is therefore an object of this invention to provide an improved, independent, replaceable probe unit for an electronic measuring system.

It is a further object of this invention to provide such a probe unit including a probe member, and probe chamber for holding the probe member, which can be easily removed and replaced, together as a unit.

It is a further object of this invention to provide such a probe unit which can be safely and easily sterilized. It is a further object of this invention to provide such a probe unit which can safely store the probe member in the thermometer housing without danger of contaminating it.

It is a further object of this invention to provide such a probe unit which can be safely stored in the thermometer housing without danger of accumulating moisture and debris in the bottom of the probe chamber or housing.

It is a further object of this invention to provide such a probe unit which positively prevents any attempt to replace the probe member in the holder if a probe cover is still on the probe member.

The invention results from the realization that the problem of contaminating the probe holder and even the entire housing and the requirement for using two or more different probes can be met by the use of a probe unit having a probe chamber which physically holds the probe member and electrically interconnects it with the rest of the system and which is easily removable and replaceable together with the probe member as a unit.

The invention features an independent replaceable probe unit for an electronic measuring system having a housing with a compartment for receiving the probe unit. The probe unit includes a probe member including a probe element bearing a sensor device for sensing the parameter to be measured by the system, and a cable electrically connected to the sensor device. The unit also includes a probe chamber removably mountable in the compartment and having a recess for receiving the probe member. The chamber includes contact means interconnected with the cable and disposed to engage corresponding contact means in the compartment, for interconnecting the probe member with the electronic measuring system.

In a preferred embodiment, the measuring system may be a temperature measuring system such as an electronic thermometer. Probe covers may be used to cover the probe element of the probe member, and the recess in the probe chamber may be made too small to accommodate the probe element with the probe cover attached, although it is large enough to accommodate the naked probe element. The recess in the probe chamber may include an interference member for gripping the probe member when it is inserted, and the recess may also include a hole at the nominal bottom of the chamber, aligned with a similar hole in the compartment for permitting evacuation of moisture and debris. The compartment which receives the chamber may be within the housing or attached to the outside of the housing, and may completely surround the chamber or cover only a portion of it. The chamber may include a detent for engaging a corresponding recess in the compartment for releasably securing the chamber in the compartment, and the chamber may also include an access member extending beyond the compartment and accessible for manipulation by the user for firmly seating and for removing the chamber from the compartment.

DISCLOSURE OF PREFERRED EMBODIMENT

Other objects, features and advantages will occur from the following description of a preferred embodiment and the accompanying drawings, in which:

FIG. 5 is an axonometric view of a probe unit including a probe member and probe chamber according to this invention;

FIG. 6 is an axonometric view of the probe member of FIG. 5 removed from the probe chamber and inserted in a probe cover, shown in phantom;

FIG. 7 is a view similar to FIG. 6 with the release mechanism actuated to strip the used probe cover from the probe element;

FIG. 8 is a front view of the probe chamber with the probe member removed;

FIG. 9 is a top plan view of the probe chamber of FIG. 8;

FIG. 10 is a sectional view taken along lines 10—10 of FIG. 8; and

FIG. 11 is a sectional view taken along lines 11—11 of FIG. 8.

Figure 1:
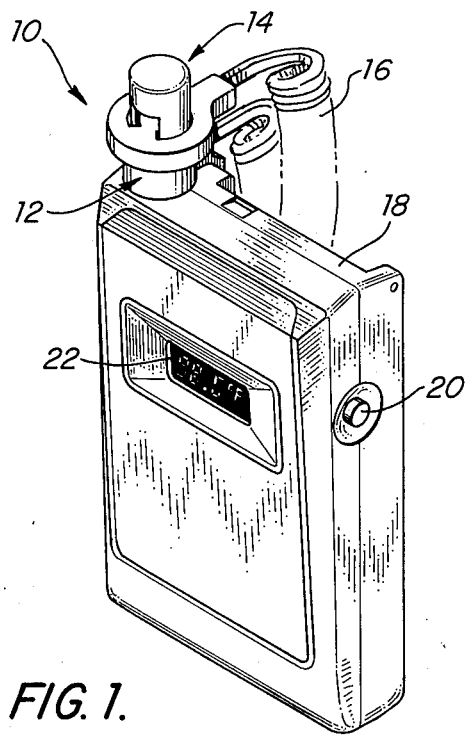
FIG. 1 is an axonometric view of the probe unit according to this invention installed in a compartment in an electronic thermometer housing.

There is shown in FIG. 1 a probe unit 10 according to this invention including probe chamber 12 and probe member 14, from which extends electrical cable 16. Probe unit 10 is mounted in thermometer housing 18, which is provided with an operating switch 20 and a liquid crystal display 22.

Figure 2:
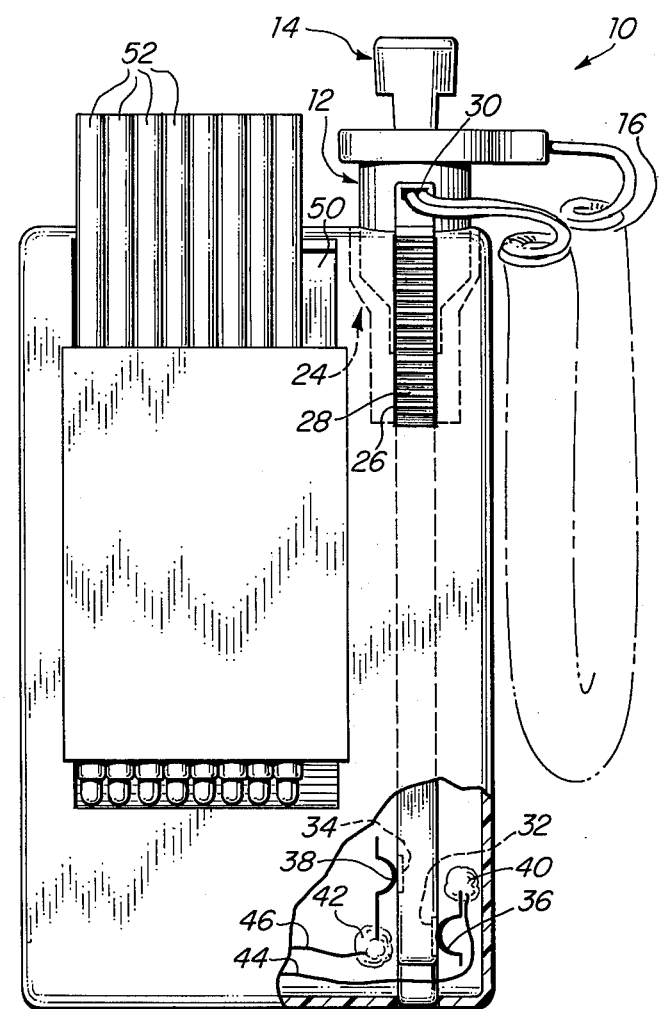
FIG. 2 is a rear elevational view of the probe unit and thermometer housing of FIG. 1 with parts broken away.

Probe chamber 12, FIG. 2, is received into compartment 24 in housing 18, which includes a slot 26 which provides access to a protruding, finely-grooved access member or finger piece 28 which may be manipulated to firmly seat chamber 12 in compartment 24 or remove it therefrom. Electrical cable 16, connected to probe member 14, enters probe chamber 12 at hole 30, and extends downwardly to connect with contacts 32 and 34 at the lower end of chamber 12. Contacts 32 and 34 are resiliently engaged by contacts 36 and 38 respectively, which electrically interconnect probe member 14 with the remainder of the thermometer circuit in housing 18. The thermometer circuit is that shown in U.S. Pat. No. 3,906,797 and U.S. Pat. application Ser. No. 473,494, filed May 28, 1974, included herein by incorporation. Contacts 36 and 38 are fastened to the housing with adhesive 40 and 42 and are electrically connected to wires 44 and 46, respectively.

A receptacle 50 is formed in the back of housing 18 for storing fresh probe covers 52 to be used with probe member 14.

Figure 3:
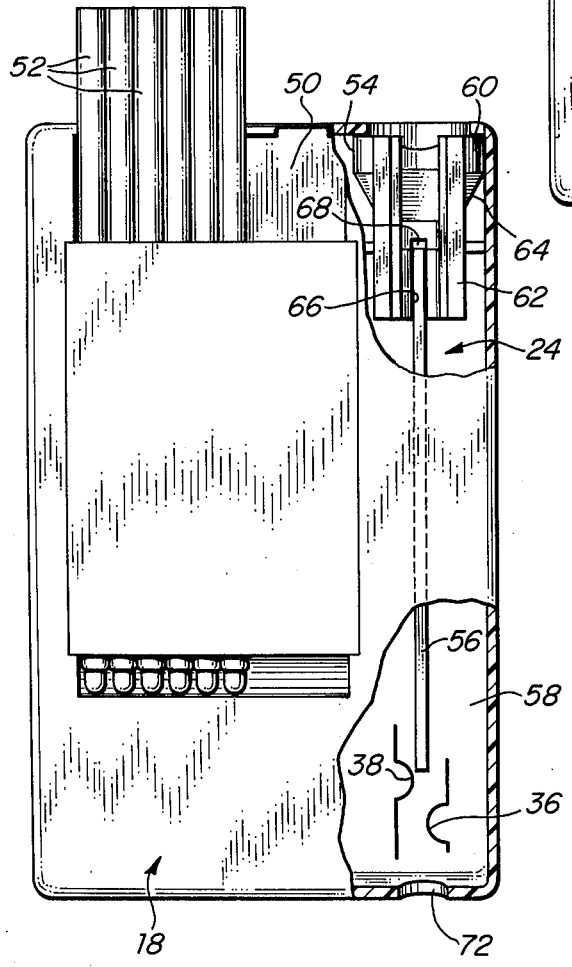
FIG. 3 is a rear elevational view of the housing in FIG. 2 with the probe unit removed and portions of the back plate broken away to reveal the compartment which receives the probe unit.
Figure 4:
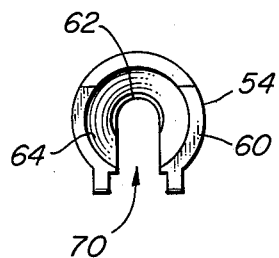
FIG. 4 is a top plan view of the collar portion of the compartment shown in FIG. 3.

Compartment 24 includes collar 54, FIG. 3, and rib 56 in cell 58 of housing 18. Other cells include the electronic circuitry, batteries and other parts of the thermometer. Collar 54 includes a large circular upper portion 60 interconnected with a lower, narrower circular portion 62 by means of an inverted frustroconical section 64, FIG. 4. Lower section 62 includes a slot 66 which receives rib 56, flush with the inner portion of section 62. Slot 66 extends slightly over the top of rib 56 to provide a recess 68. An additional slot 70 extends the entire length of collar 54 for receiving finger piece 28 of chamber 12. Compartment 24 includes an evacuation hole 72 in the nominal bottom end thereof. Although in this embodiment compartment 24 has been illustrated as a closed compartment within housing 18, it may as well be a closed compartment external to the housing or may be a partially closed structure either within or without the housing. Probe chamber 12, FIG. 5, includes neck 74, which is generally circular in its upper section 76 and narrows through inverted frustroconical section 78 to a smaller circular area at section 80. Chamber 12 also includes elongate flat section 81, whose forward edge 82 resides against rib 56 when chamber 12 is installed in compartment 24.

Rearward edge 84 carries finger piece 28 which is accommodated by slot 70 in collar 54 and slot 26 in the back of housing 18 when chamber 12 is installed in compartment 24. Evacuation hole 86 at the nominal bottom of section 81 aligns with hole 72 in housing 18. Holes 72 and 86 serve to evacuate any moisture or debris deposited by probe member 14 which might otherwise tend to accumulate in the bottom of chamber 12 or compartment 24. Detent 88, located proximate the junction of the section 80 and leading edge 82 of lower section 81, is received in recess 68 of collar 54, FIG. 3, and securely positions chamber 12 in compartment 24.

Probe member 14, FIG. 6, includes handle 90 and probe element 92. Probe element 92 includes mounting tube 94 and a second elongate tube 96 which is fixed to tube 94 and contains proximate its free end a thermistor 98 or other sensing device suitable for sensing the parameter to be monitored. Tube 96 contains at its other end one or more sharp, flared edges 99. Handle 90 includes disc 100, including arm 102 for receiving cable 16. Disc 100 is fixed to a generally cylindrical member 104, which is fixed to tube 94. Handle 90 also includes a plunger 106, which is slidable on member 104 through apertures 105 and 107 (107 not shown) in disc 100.

Probe element 92, FIG. 6, is inserted in a probe cover 110 until the tip 111 of the probe cover is firmly seated about the tip 112 of tube 96, and the other, open end 114 of probe cover 110 has passed over the sharp edges 99 and has become securely impaled by them. With this configuraton, a patient's temperature may be taken. After the temperature is taken, probe cover 110 may be discarded, FIG. 7, by pressing on the top of plunger 106 as indicated by the direction of arrow 116, so that the forward annular end 118 of plunger 106 engages end 114 of probe member 110, pushing it over the sharpened edges 99 and ejecting it from tube 96.

Sections 76, 78, and 80 of neck 75, FIG. 8–11, combined with elongate passage 120, which receives tubes 96 and 94, form recess 122 which receives probe member 14, which contains at its lower end evacuation hole 86. One or more interfering members such as flats 124 on the inner surface of section 74, may be included to snugly grip the contours of the lower portion of plunger 106 of probe member 14, to secure it in position and prevent it from falling out of chamber 12, even when the chamber is turned upside down.

Contact 32 is flush with surface 130 of chamber 12 and resides in hole 132 while contact 34 resides in hole 134 and is flush with surface 136 of chamber 12. Space 138 in hole 132 behind contact 32 and space 140 in hole 134 behind contact 34 are used to connect the respective contacts to wires of cable 16, which then is routed through channel 142 and out hole 30.

Thus the probe unit prevents inadvertant contamination of the probe chamber by preventing insertion of the probe member in the chamber if the probe cover is still installed. Even if the probe chamber becomes contaminated, such as, for example, by a contamination of the probe element itself without cover, the entire probe chamber and probe member may be removed as a unit without fear of contamination of the remainder of the thermometer and housing,, so that a new probe unit with uncontaminated chamber and probe member may be inserted and the thermometer may continue to be used. In addition, particularly in the case of thermometers used for oral and rectal temperature measurement, two different probes can be used: a red probe unit may be used for rectal temperatures and may be removed and replaced with a blue probe unit when oral temperatures are to be taken. Although the particular embodiment in the structure described herein has been described for use with an electronic thermometer and the probe member contains a heat-sensing device, this is not a necessary limitation of the invention. It may be used to measure various other parameters in other industries where contamination is a problem or where easy and rapid interchange of probe units is desired.

Other embodiments will occur to those skilled in the art and are within the following claims:

What is claimed is:

1. An independent, replaceable probe unit for an electronic measuring system having a housing with a compartment for receiving said probe unit, comprising:
   a probe member including a probe element bearing a sensor device for sensing the parameter to be measured by the system and a cable electrically connected to said sensor device; and
   a probe chamber removably mountable in said compartment and having a recess for receiving said probe member, said chamber including contact means interconnected with said cable and disposed to engage corresponding contact means in said compartment for interconnecting said probe member with the electronic measuring system.

2. The probe unit of claim 1 in which said probe member receives a probe cover over said probe element and said recess in said probe chamber is too small to accommodate said probe element with a probe cover attached, but large enough to accommodate said probe element.

3. The probe unit of claim 1 in which said recess chamber includes an interference member for firmly gripping said probe member.

4. The probe unit of claim 1 in which said recess includes a hole at the nominal bottom of said chamber for permitting evacuation of moisture and debris.

5. The probe unit of claim 4 in which said compartment includes a hole aligned with said hole in said chamber.

6. The probe unit of claim 1 in which said compartment is within said housing.

7. The probe unit of claim 1 in which said compartment surrounds said chamber.

8. The probe unit of claim 1 in which said chamber includes a detent for engagement with a corresponding recess in said compartment for releasably securing said chamber in said compartment.

9. The probe unit of claim 1 in which said chamber includes an access member extending beyond said compartment and accessible for firmly seating and for removing said chamber from said compartment.

10. An independent, replaceable probe unit for an electronic thermometer having a housing with a compartment for receiving said probe unit, said probe unit comprising:
   a probe member including a probe element bearing a heat-sensitive device and a cable electrically connected to said heat-sensitive device;
   a probe chamber removably mountable in said compartment and having recess for receiving said probe member, said chamber including contact means interconnected with said cable and disposed to engaging corresponding contact means in said compartment, for interconnecting said probe member with the electronic thermometer.

* * * * *

Notice of Adverse Decision in Interference

In Interference No. 100,619, involving Patent No. 4,008,614, R. B. Turner and P. E. Brefka, REMOVABLE PROBE UNIT FOR ELECTRONIC MEASURING SYSTEM, final judgment adverse to the patentees was rendered Sept. 27, 1983, as to claims 1–3, 6, 7, 9 and 10.

[*Official Gazette March 13, 1984.*]